(12) United States Patent
Shin et al.

(10) Patent No.: US 9,448,595 B2
(45) Date of Patent: Sep. 20, 2016

(54) ELECTRONIC DEVICE WITH DETACHABLE COMPONENT

(71) Applicant: Samsung Electronics Co., Ltd., Gyeonggi-do (KR)

(72) Inventors: Yun-Sung Shin, Gyeonggi-do (KR); Jae-Woo Lee, Seoul (KR); Ho-Eun Yoo, Seoul (KR); Ju-Ho Yi, Gyeonggi-do (KR); Jin-Ho Lim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 52 days.

(21) Appl. No.: 14/607,678

(22) Filed: Jan. 28, 2015

(65) Prior Publication Data

US 2015/0212552 A1  Jul. 30, 2015

(30) Foreign Application Priority Data

Jan. 29, 2014  (KR) .................. 10-2014-0011594

(51) Int. Cl.
*G06F 1/16* (2006.01)

(52) U.S. Cl.
CPC ........... *G06F 1/1675* (2013.01); *G06F 1/1656* (2013.01)

(58) Field of Classification Search
CPC .. G06T 19/00; G06F 1/1675; H04M 1/0237; H02J 7/0021
USPC ............... 455/419, 418, 575.1, 575.4, 550.1, 455/456.3, 412.2, 466, 404.1; 361/679.26, 361/679.01, 679.41, 679.55, 679.3, 679.4, 361/679.56, 679.27, 679.58, 679.12, 361/679.09; 345/633, 156, 41.2, 3.01, 173, 345/1.3, 1.1, 1.2, 619, 665, 169, 163, 168; 248/558, 157; 312/223.1, 223.2, 223.3
See application file for complete search history.

(56) References Cited

U.S. PATENT DOCUMENTS

| 6,212,066 | B1 | 4/2001 | Fetterman |
| 7,450,968 | B2* | 11/2008 | Jung ................... H04M 1/0237 455/566 |
| 2013/0003286 | A1 | 1/2013 | Abe |
| 2013/0242476 | A1 | 9/2013 | Tu |
| 2015/0048837 | A1* | 2/2015 | Oh ........................ H02J 7/0021 324/427 |

FOREIGN PATENT DOCUMENTS

| EP | 2 540 359 A2 | 1/2013 |
| KR | 10-2011-0092909 A | 8/2011 |
| KR | 10-2013-0011747 A | 1/2013 |

* cited by examiner

*Primary Examiner* — Hung Duong
(74) *Attorney, Agent, or Firm* — Cha & Reiter, LLC.

(57) ABSTRACT

An electronic device may includes a housing including a portion that is transitionable between a pop-up state and a non-pop-up state, a locker for holding the portion of the housing in the non-pop-up state, and a pop-up device for popping up the portion of the housing when the locker releases the portion of the housing such that transitioning between the pop-up and non-pop-up states is allowed.

20 Claims, 14 Drawing Sheets

ELECTRONIC DEVICE WITH DETACHABLE COMPONENT

CLAIM OF PRIORITY

This application claims priority under 35 U.S.C. §119(a) from a Korean Patent Application filed in the Korean Intellectual Property Office on Jan. 29, 2014 and assigned Serial No. 10-2014-0011594, the entire disclosure of which is hereby incorporated by reference.

BACKGROUND

1. Technical Field

The present disclosure generally relates to an electronic device including a detachable component.

2. Description of the Related Art

At present, with the growth of electronic communication industries, user devices (e.g., electronic devices such as smartphones, cellular phones, electronic schedulers, personal complex terminals, laptop computers, and the like) are becoming necessities to modern society and significant means for delivery of fast changing information. Such user devices provide a Graphical User Interface (GUI) environment using a touch screen, as well as a variety of multimedia based on a web environment.

Also, the user devices may be operatively coupled or a variety of electronic components may be mounted to the user devices so as to provide a variety of functions. For example, stereo speaker modules may be mounted to the user devices to provide stereo sound when using music functions of the devices. Also, for example, camera modules providing photography functions may be mounted to the user devices. Communication modules providing functions of communication with other electronic devices through a network may also be mounted to the user devices.

SUMMARY

In an embodiment of the present disclosure, an electronic device may be configured to facilitate easily detaching or allowing access to at least one electronic component (e.g., a battery, a memory card, and/or the like) of the device.

In another embodiment of the present disclosure, an electronic device may be capable of easily detaching, releasing, or opening a cover installed in or coupled to at least a portion of a housing.

In a further embodiment of the present disclosure, an electronic device may include a housing including at least a portion thereof that is transitionable between a pop-up state and a non-pop-up state relative to the remainder of the housing, a locker for holding the portion of the housing in the non-pop-up state, and a pop-up device for popping up at least part of the portion of the housing when the locker releases at least the portion of the housing to allow transitioning of the portion between the pop-up and non-pop-up states.

These and other aspects of the present disclosure are described in greater detail hereinbelow.

BRIEF DESCRIPTION OF THE DRAWINGS

The above features and advantages of the present disclosure will become more apparent from the following detailed description when taken in conjunction with the accompanying drawings in which.

DETAILED DESCRIPTION

Figure 1:
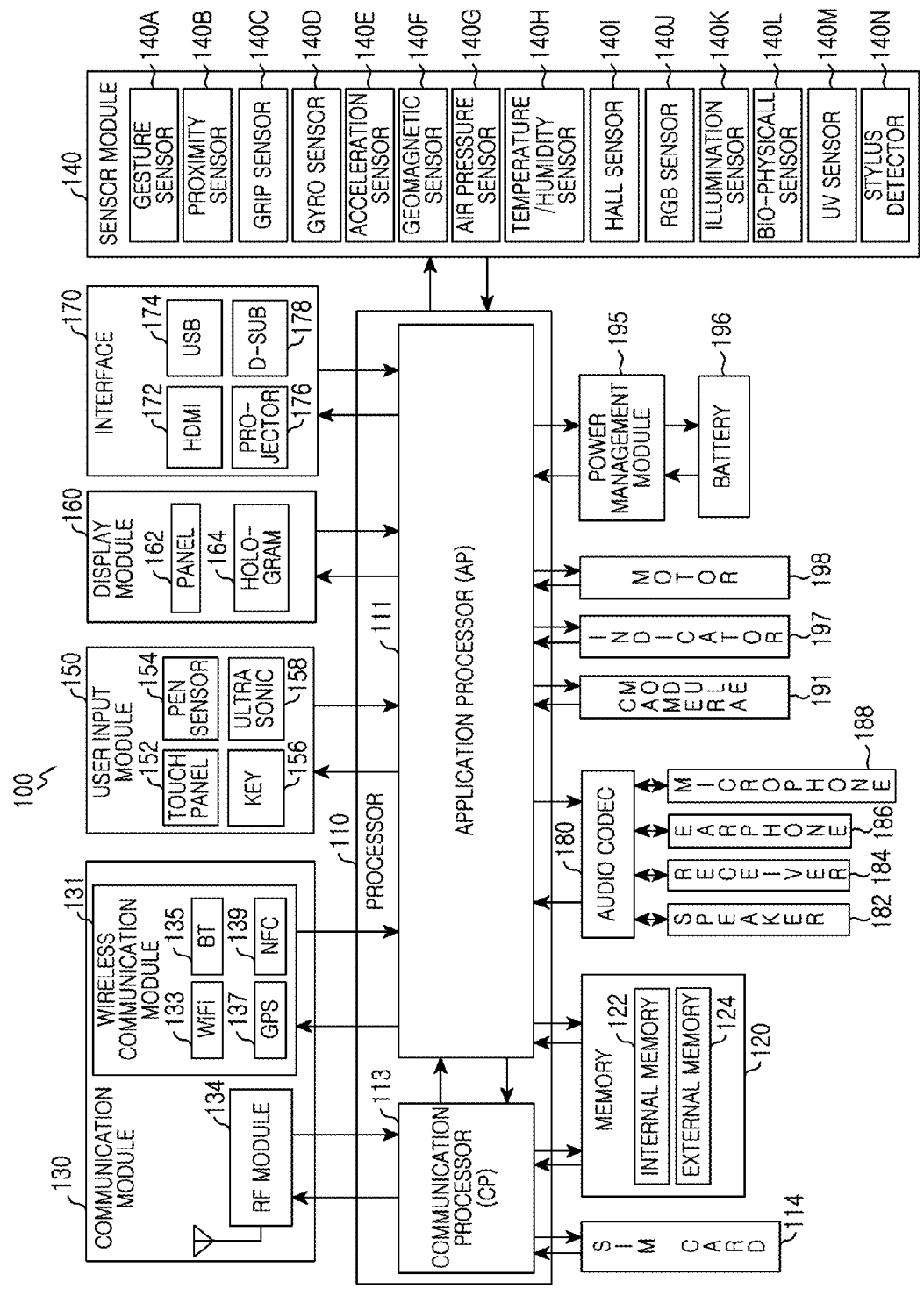
FIG. 1 is a block diagram illustrating a construction of hardware according to an embodiment of the present disclosure.

Various embodiments of the present disclosure are described below with reference to the accompanying drawings. Various embodiments of the present disclosure are illustrated in the accompanying drawings and a related detailed description is stated. It should be understood that various modifications may be made to the embodiments without departing from the scope and spirit of the present disclosure. Accordingly, it should be understood that the various embodiments of the present disclosure are not intended to limit a specific embodiment form, and include all possible modifications or equivalents or substitutes within the spirit and technological scope of the present disclosure. In relation to a description of the drawing, like reference symbols denote like constituent elements.

Expressions such as "include" or "may include," etc. that may be used for the present disclosure indicate existence of a disclosed relevant function, operation, or element, etc., and do not limit other functions, operations, or elements, etc. Also, it should be understood that terminologies such as "include" or "have", etc. in the present disclosure are intended for designating existence of a characteristic, a number, a step, an operation, an element, a part, or a combination of these described in the specification and do not exclude the existence or addition of other characteristics, numbers, tasks, operations, elements, parts, or a combination thereof.

Expressions such as "or", etc. in the present disclosure include at least one of the words and any and all combinations of the words listed together. For example, "A or B" may include A and may include B, or include both A and B.

In the present disclosure, ordinal expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle (therebetween). In contrast, when it is mentioned that a certain element is "directly connected to" or "directly accesses" another element, it should be understood that still another element does not exist between the elements.

Terminologies used in the present disclosure are provided for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary may have meaning coinciding with meaning on context of a related technology, and unless clearly defined in the present disclosure, they are not understood as an ideal or excessively formal meaning.

An electronic device according to various embodiments of the present disclosure may be a device including a telecommunication function. For example, the electronic device may include a smart phone, a tablet Personal Computer (PC), a mobile phone, a video phone, an electronic book (e-book) reader, a desktop PC, a Personal Digital Assistant (PDA), a Portable Media Player (PMP), an MPEG Audio Layer 3 (MP3) player, a mobile medical instrument, a camera, or a wearable device (e.g., a Head-Mounted Display (HMD) such as electronic glasses, electronic clothes, an electronic bracelet, an electronic necklace, an appcessory (i.e., a smartphone accessory that is combined with a specially written application to perform a function), or a smart watch).

According to some embodiments, the electronic device may be smart electronic home appliances having a telecommunication function. The smart electronic home appliances, for example, the electronic device may include at least one of a television, a Digital Versatile Disc (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, a camcorder, or an electronic frame.

According to some embodiments, the electronic device may include at least one of various medical instruments (e.g., Magnetic Resonance Angiography (MRA), Magnetic Resonance Imaging (MRI), Computerized Tomography (CT), a moving-camera, an ultrasonic machine and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass and the like), avionics, or a security instrument.

According to some embodiments, the electronic device may include at least one of a part of furniture or building/structure including a telecommunication function, an electronic board, an electronic signature receiving device, a projector, or various metering instruments to measure a variety of things (e.g., tap water, electricity, gas, radio wave or the like). The electronic device according to various embodiments of the present disclosure may be one of the aforementioned various devices or a combination of two or more. Also, it is understood those skilled in the art that the electronic device according to various embodiments of the present disclosure is not limited to the aforementioned instruments.

FIG. 1 is a block diagram illustrating a construction of hardware according to an embodiment of the present disclosure.

Referring now to FIG. 1, the hardware 100 may include at least one processor 110, a Subscriber Identification Module (SIM) card 114, a memory 120, a communication module 130, a sensor module 140, a user input module 150, a display module 160, an interface 170, an audio codec 180, a camera module 191, a power management module 185, a battery 196, an indicator 197, or a motor 198.

The processor 110 may include at least one Application Processor (AP) 111 or at least one Communication Processor (CP) 113. FIG. 1 illustrates that the AP 111 and the CP 113 may be included within the processor 110, but the AP 111 and the CP 113 may be included within different IC packages, respectively. The AP 111 and the CP 113 may be also included within one IC package.

The AP 111 may drive an operating system or an application program and may control a plurality of hardware or software constituent elements that are coupled to the AP 111, and may perform processing and operations of various data including multimedia data. The AP 111 may be, for example, implemented as a System on Chip (SoC). The processor 110 may also further include a Graphic Processing Unit (GPU) (not shown).

The CP 113 may perform a function of managing a data link and converting a communication protocol in a communication between the hardware 100 and other hardware coupled through a network. The CP 113 may be implemented as a SoC, for example. The CP 113 may also perform at least part of a multimedia control function. The CP 113 may perform, for example, terminal distinction and authentication within a telecommunication network, using a subscriber identity module (e.g., the SIM card 114). The CP 113 may provide services such as voice telephony, video telephony, a text message, packet data or the like to a user.

The CP 113 may control data transmission/reception of the communication module 130. In FIG. 1, the constituent elements such as the CP 113, the power management module 185, the memory 120 or the like are illustrated as constituent elements apart from the AP 111, but the AP 111 may be also implemented to include at least some of the aforementioned constituent elements (e.g., the CP 113).

The AP 111 or the CP 113 may load to a volatile memory an instruction or data received from a non-volatile memory coupled to each of the AP 111 and the CP 113 or at least one of other constituent elements, and process the loaded instruction or data. The AP 111 or the CP 113 may store in the non-volatile memory data received from at least one of the other constituent elements or generated by at least one of the other constituent elements.

The SIM card 114 may be a card implementing the subscriber identity module, and may be inserted into a slot provided in a specific location of the hardware 100. The SIM card 114 may include unique identification information (e.g., Integrated Circuit Card ID (ICCID)) or subscriber information (e.g., International Mobile Subscriber Identity (IMSI)).

The memory 120 may include an internal memory 122 or an external memory 124. The internal memory 122 may include, for example, at least one of a volatile memory (e.g., a Dynamic Random Access Memory (DRAM), a Static Random Access Memory (SRAM), a Synchronous Dynamic Random Access Memory (SDRAM) and the like) or a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory and the like). The internal memory 122 may also take a form of Solid State Drive (SSD). The external memory 124 may further include, for example, Compact Flash (CF), Secure Digital (SD), Micro Secure Digital (Micro-SD), Mini Secure Digital (Mini-SD), extreme Digital (xD), a memory stick or the like.

The communication module 130 may include a wireless communication module 131 or a Radio Frequency (RF) module 134. The wireless communication module 131 may include, for example, WiFi 133, BT 135, GPS 137 or NFC 139. For example, the wireless communication module 131 may provide a wireless telecommunication function using radio frequency. Additionally or alternatively, the wireless communication module 131 may include a network interface (e.g., a LAN card) for coupling the hardware 100 with a network (e.g., the Internet, a LAN, a WAN, a telecommunication network, a cellular network, a satellite network, a POTS or the like), a modem or the like.

The RF module 134 may take charge of transmission/reception of data, for example, transmission/reception of an RF signal or a called electronic signal. The RF module 134 may include, though not illustrated, for example, a transceiver, a Power Amplifier Module (PAM), a frequency filter, a Low Noise Amplifier (LNA) or the like. The RF module 134 may further include a component for transmitting/receiving an electromagnetic wave on a free space in a wireless communication, for example, a conductor, a conductive wire or the like.

The sensor module 140 may include, for example, at least one of a gesture sensor 140A, a proximity sensor 140B, a grip sensor 140C, a gyro sensor 140D, an acceleration sensor 140E, a geomagnetic sensor 140F, an air pressure sensor 140G, a temperature/humidity sensor 140F, a hall sensor 140I, a Red Green Blue (RGB) sensor 140J, an illumination sensor 140K, a bio-physical sensor 140L, a Ultraviolet (UV) sensor 140M or a stylus detector 140N. The sensor module 140 may measure a physical quantity or sense an activation state of the hardware and convert the measured or sensed information into an electric signal. Additionally or alternatively, the sensor module 140 may include, for example, an Electronic nose (E-nose) sensor (not shown), an Electromyography (EMG) sensor (not shown), an Electroencephalogram (EEG) sensor (not shown), an Electrocardiogram (ECG) sensor (not shown), a fingerprint sensor (not shown) or the like. The sensor module 140 may further include a control circuit for controlling at least one sensor provided therein.

The user input module 150 may include a touch panel 152, a (digital) pen sensor (e.g., digitizer) 154, a key 156, or an ultrasonic input device 158. The touch panel 152 may recognize, for example, a touch input in at least one method among a capacitive method, a pressure sensitive method, an infrared method, or an ultrasonic method. The touch panel 152 may also further include a controller (not shown). In the capacitive method, proximity recognition as well as direct touch is possible. The touch panel 152 may also further include a tactile layer. Here, the touch panel 152 may provide a tactile response to a user.

The (digital) pen sensor 154 may be implemented, for example, using at least one method among a capacitive method, a pressure sensitive method, an infrared method, or an ultrasonic method being the same or similar method with receiving a user's touch input or a separate recognizing sheet. The key 156 may be, for example, a keypad or a touch key. The ultrasonic input device 158 may be a device capable of identifying data by sensing a sound wave with a microphone through a pen generating an ultrasonic signal, and may perform wireless recognition. The hardware 100 may also receive a user input from an external device (e.g., a network, a computer, or a server) coupled to the hardware 100 using the communication module 130.

The display module 160 may include a panel 162 or a hologram 164. The panel 162 may be, for example, a Liquid Crystal Display (LCD), a Thin Film Transistor Liquid Crystal Display (TFT LCD), a Passive-Matrix Organic Light-Emitting Diode (PM-OLED), an Active-Matrix Organic Light-Emitting Diode (AMOLED), or the like. The panel 162 may be implemented to be flexible, transparent, or wearable, for example. The panel 162 may be also constructed as one module together with the touch panel 152. The hologram 164 may show a three-dimensional image in the air by using interference of light. The display module 160 may further include a control circuit for controlling the panel 162 or the hologram 164.

The interface 170 may include, for example, a High-Definition Multimedia Interface (HDMI) 172, a Universal Serial Bus (USB) 174, a projector 176, or a D-subminiature (D-sub) 178. Additionally or alternatively, the interface 170 may include, for example, Secure Digital/Multi Media Card (SD/MMC) (not shown) or Infrared Data Association (IrDA) (not shown).

The audio codec 180 may convert a voice and an electric signal interactively. The audio codec 180 may convert, for example, voice information that is inputted or outputted through a speaker 182, a receiver 184, an earphone 186, the microphone 188, or the like.

The camera module 191 is a device capable of taking a picture and a video. According to one example embodiment, the camera module 191 may include at least one image sensor (e.g., front lens or rear lens) or Image Signal Processor (ISP) (not shown).

The power management module 185 may manage electric power of the hardware 100. Though not illustrated, the power management module 185 may include, for example, a Power Management Integrated Circuit (PMIC), a charger Integrated Circuit (IC), or a battery fuel gauge.

The PMIC may be mounted, for example, within an integrated circuit or a SoC semiconductor. A charging method may be divided into a wired charging method and a wireless charging method. The charger IC may charge a battery, and may prevent the inflow of overvoltage or overcurrent from an electric charger. The charger IC may include a charger IC for at least one of the wired charging method or the wireless charging method. As the wireless charging method, there are a magnetic resonance method, a magnetic induction method, an electromagnetic wave method or the like, for example. Supplementary circuits for wireless charging, for example, circuits such as a coil loop, a resonance circuit, a rectifier and the like may be added.

The battery fuel gauge may measure, for example, a level of the battery 196, a charging voltage thereof, a charging current thereof, or a charging temperature thereof. The battery 196 may generate electricity and supply a power source. The battery 196 may be, for example, a rechargeable battery.

The indicator 197 may indicate a specific state of the hardware 100 or a part (e.g., the AP 111) thereof, for example, a booting state, a message state, a charging state or the like. The motor 198 may convert an electric signal into a mechanical vibration. A non-illustrated Microcontroller Unit (MCU) may control the sensor module 140.

Though not illustrated, the hardware 100 may include a processing device (e.g., a GPU) for mobile TV support. The processing device for mobile TV support may process, for example, standard media data of Digital Multimedia Broadcasting (DMB), Digital Video Broadcasting (DVB), a media flow or the like.

The names of the aforementioned constituent elements of the hardware according to one embodiment may be different according to the kind of the hardware. The hardware according to one embodiment may include at least one of the aforementioned constituent elements, and may omit some constituent elements or further include additional other constituent elements. Also, some of the constituent elements of the hardware according to one embodiment are combined and constructed as one entity, thereby being able to identically perform the functions of the corresponding constituent elements before combination.

Figure 2:
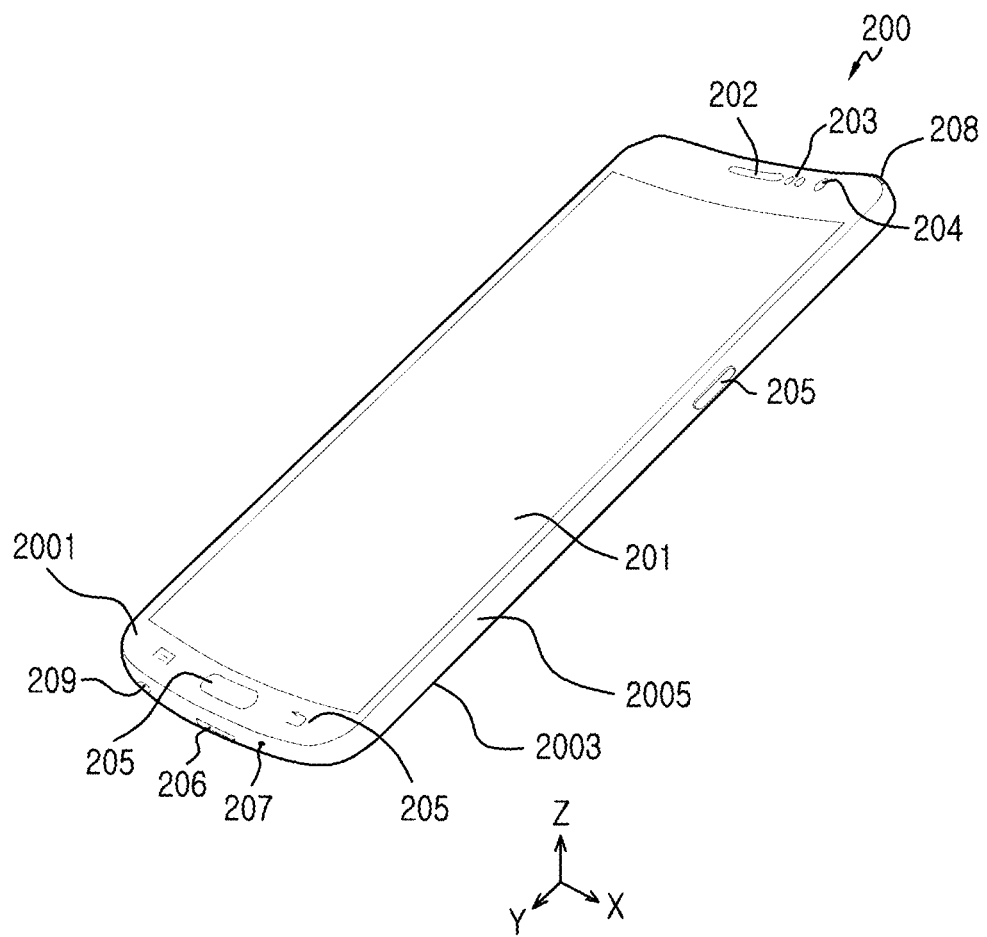
FIG. 2 is a perspective view illustrating an electronic device according to an embodiment of the present disclosure.

FIG. 2 is a perspective view illustrating an electronic device according to various embodiments of the present disclosure. The electronic device 200 may be, for example, the hardware 100 illustrated in FIG. 1. The electronic device 200, which may have a generally curved shape, may include an upper curved surface 2001 and a lower curved surface 2003. For example, the electronic device 200 may be of a shape bent in portrait orientation (i.e., orientation in which a horizontal length is shorter than a vertical length). Although not illustrated, the electronic device 200 may be of a shape bent in landscape orientation (i.e., orientation in which the vertical length is longer than the horizontal length).

Referring now to FIG. 2, the electronic device 200 may include a touch screen 201, a speaker 202 (e.g., the speaker 182), at least one sensor 203 (e.g., the sensor module 140), a camera 204 (e.g., the camera module 191), at least one key 205 (e.g., the key 156), an external port 206 (e.g., the interface 170), a microphone 207 (e.g., the microphone 188), an antenna 208, and/or a stylus 209.

The touch screen (or touch sensitive screen) 201 may be arranged on the upper curved surface 2001 of the electronic device 200. The touch screen 201 may be of a curved shape. The touch screen 201 may include a window (not shown), a touch panel (e.g., the touch panel 152), a display panel (e.g., the panel 162) or a digitizer (e.g., the pen sensor 154).

The speaker 202 may be arranged in the upper curved surface 2001 of the electronic device 200.

The at least one key 205 may be arranged in the upper curved surface 2001 of the electronic device 200 or in a lateral surface 2005 (i.e., a surface between the upper curved surface 2001 and the lower curved surface 2002). The at least one key 205 may include a key capable of adjusting a volume or a key capable of powering On or Off.

The external port 206 may be arranged in the lateral surface 2005 of the electronic device 200. The external port 206 may be used for data communication or charging.

The microphone 207 may be arranged in the lateral surface 205 of the electronic device 200.

The antenna 208 (e.g., a Digital Multimedia Broadcasting (DMB) antenna) may be dragged out and extended through an opening part (not shown), which may be arranged in the lateral surface 2005 of the electronic device 200.

The stylus 209 may be attached and detached in a manner of going in and out through an opening provided in the lateral surface 2005 of the electronic device 200. The stylus 209 may generate a touch input to the pen sensor 154 of FIG. 1.

Figure 3:
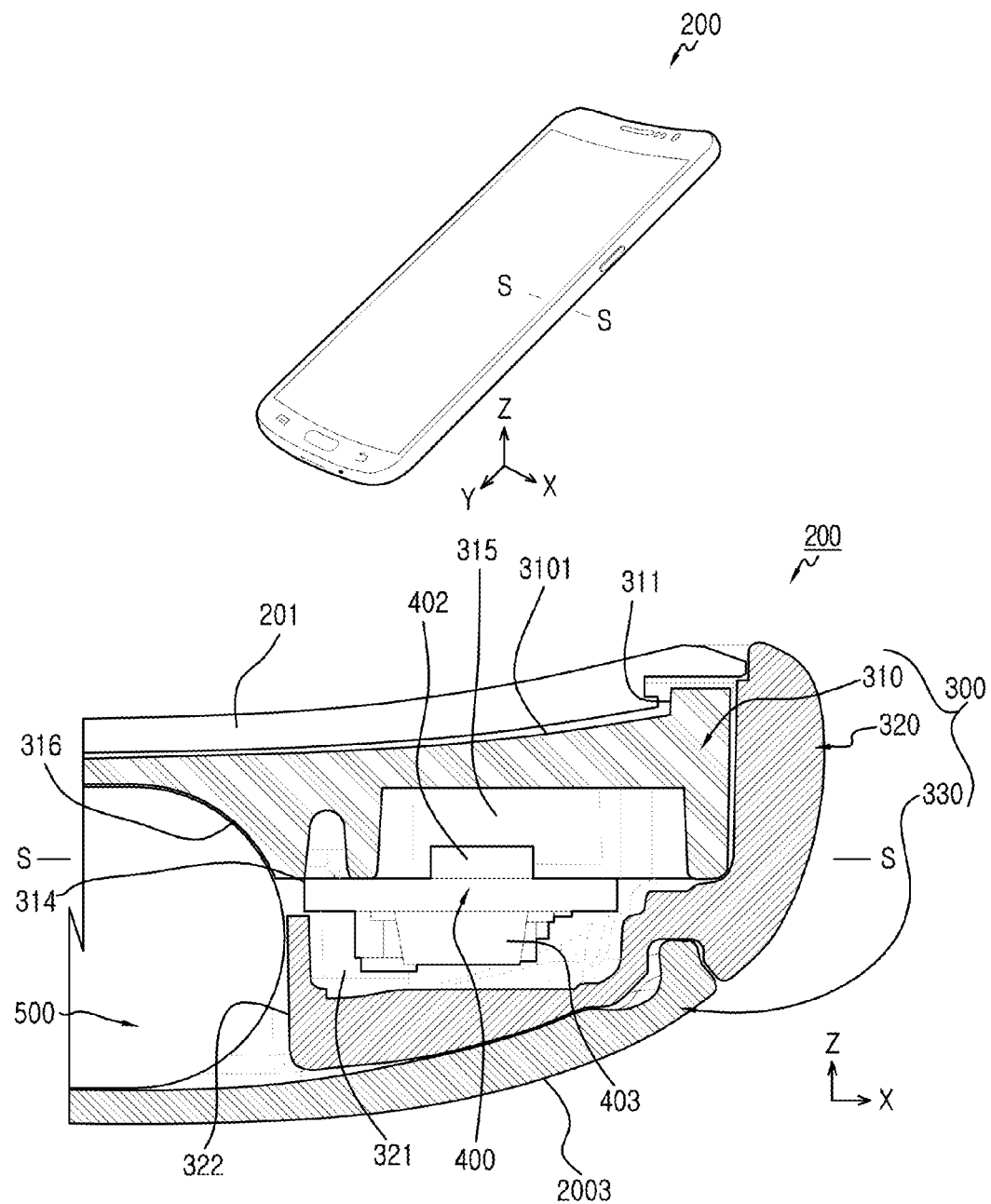
FIG. 3 is a cross section illustrating a part taken along line S-S of an electronic device according to an embodiment of the present disclosure.

FIG. 3 is a cross section illustrating a part taken along line S-S of an electronic device according to various embodiments of the present disclosure.

Referring now to FIG. 3, the part taken along line S-S may include the touch screen 201, a housing 300, a main circuit board 400 or a battery 500 (e.g., the battery 196 (FIG. 1)).

The touch screen 201 may include a plurality of laminate elements (e.g., the window, the touch panel 152, the panel 162, the pen sensor 154 or the like).

The housing 300 may include a bracket 310, a device case (or a device case frame) 320 and/or a battery cover 330.

The bracket 310 may be a mounting plate (i.e., an installation plate) capable of installing a plurality of electronic components. The bracket 310 may be a frame capable of fixing and supporting the plurality of electronic components (e.g., the processor 110, the memory 120, the SIM card 114, the audio codec 180, the speaker 182, the receiver 184, the microphone 188, the camera module 191, the indicator 197, the motor 198, the power management module 185, the battery 196, the communication module 130, the user input module 150, the display module 160, the interface 170, the sensor module 140, or the like). The bracket 310 may be molded of non-metallic or metallic materials. The bracket 310 may include a first surface (not shown) formed at the top thereof and a second surface (not shown) formed at the bottom thereof The first surface and second surface of the bracket 310 may be mounting surfaces for mounting the electronic components. The first surface and/or second surface of the bracket 310 may include surfaces of various forms such as a plane, a curved surface, or the like.

The bracket 310 may include an installation groove 311 arranged in the top 3101 of the bracket 310, and the touch screen 201 may be arranged in the installation groove 311. The bracket 310 may include an installation groove 314 arranged in the bottom 3102 of the bracket 310, and the main circuit board 400 may be arranged in the installation groove 314 of the bracket 310. The bracket 310 may include an electronic component accepting groove 315 capable of accepting electronic components 402 protruded upward (e.g., toward the bracket 310) from the main circuit board 400. The bracket 310 may accept a portion of the battery 500 at the bottom 3102 thereof, and may include a battery accepting groove 316 of a container shape which is concaved down. The bracket 310 may also include at least one metal part (not shown) (e.g., a metal frame, a metal coating or the like) electrically connectable with the ground of the main circuit board 400.

The device case 320 may be coupled (e.g., snap-fit fastened or bolt fastened) to the bracket 310. The device case 320 may cover a plurality of components fixed to the bracket 310. The device case 320 may cover at least a portion of the main circuit board 400 fixed to the bracket 310. The bracket 310, the device case 320, and the main circuit board 400 may be coupled together in a bolt fastening manner. The device case 320 may include an electronic component accepting groove 321 capable of accepting electronic components protruded down (e.g., toward the device case 320) from the main circuit board 400. The device case 320 may include a battery accepting part 322 capable of accepting the battery 500. As illustrated, the battery accepting part 322 of the device case 320 is opened at the top and bottom of the device case 320, and may communicate with the battery accepting groove 316 of the container shape of the bracket 310. If the bracket 310 and the device case 320 are coupled with each other, the battery accepting groove 316 of the bracket 310 and the battery accepting part 322 of the device case 320 may prepare a space of a container shape capable of accepting the entire battery 500. The battery accepting part 322 of the device case 320 itself may be also of a container shape capable of accepting the entire battery 500, and the battery accepting groove 316 of the bracket 310 may also be unnecessary. Also, the battery accepting groove 316 of the bracket 310 itself may be of a container shape capable of accepting the entire battery 500, and the battery accepting part 322 of the device case 320 may also be unnecessary.

The battery cover 330 may be coupled to the device case 320, and may form a rear surface (e.g., the lower curved surface 2003 or a curved surface bottom) of the electronic device 200.

Figure 4:
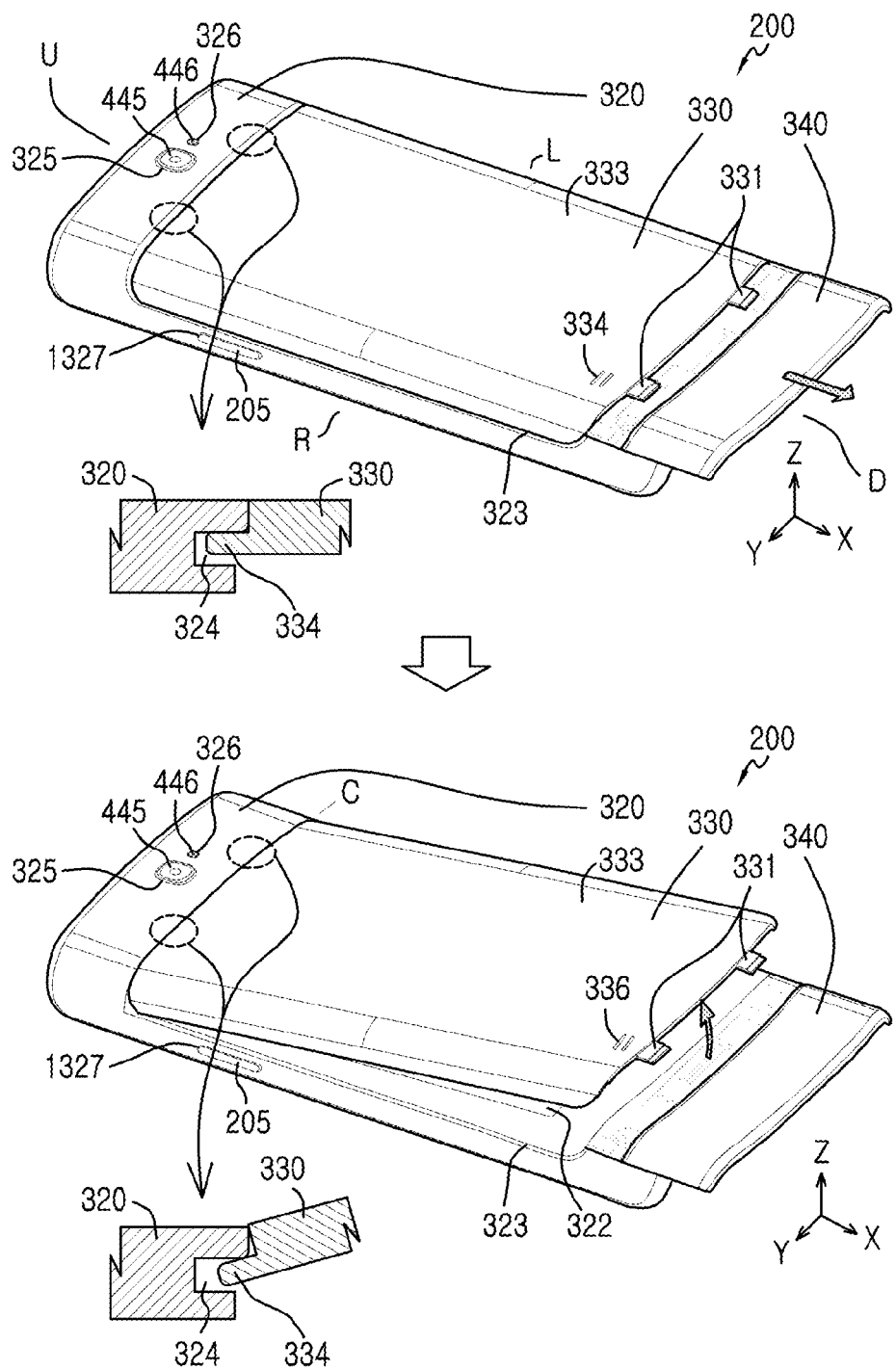
FIG. 4 is a diagram illustrating detachment of a battery cover in an electronic device according to an embodiment of the present disclosure.

FIG. 4 is a diagram illustrating detachment of a battery cover in an electronic device according to an embodiment of the present disclosure.

Referring now to FIG. 4, the electronic device 200 may include the device case 320, the battery cover 330, and/or a locker 340. The battery cover 330 is coupled to the device case 320 by means of the locker 340. The device case 320, the battery cover 330 and the locker 340 may form the rear surface (e.g., the lower curved surface 2003 of FIG. 2) of the electronic device 200.

The device case 320 may include a battery cover installation part 323, at least one protrusion groove 324, a camera hole 325, a flash hole 326 and/or a key-hole 1327. The battery cover installation part 323 is a part capable of fitting the battery cover 330. The battery cover installation part 323 may include the battery accepting part 322. A socket for a memory card (not shown) (e.g., CF, SD, Micro-SD, Mini-SD, xD, a memory stick, a SIM, a Universal Subscriber Identity Module (USIM) or the like) may be arranged in the battery cover installation part 323. Or, a socket for an identification card (not shown) may be also arranged in the battery cover installation part 323.

If the battery cover 330 is detached from the device case 320, the battery 500 of FIG. 3 may be detachable from the battery accepting part 322 of the device case 320, and/or the memory card (not shown) may be detachable from the memory card socket (not shown). The at least one protrusion groove 324 may be provided at one side (e.g., the up direction (U) of the electronic device 200) of the battery cover installation part 323. The at least one protrusion groove 324 is a groove into which at least one protrusion 334 of the battery cover 300 may be inserted. The camera hole 325 may be arranged in the rear surface (e.g., the lower curved surface 2003 of FIG. 2) of the electronic device 200, and may expose a camera 445 in a passing manner. The flash hole 326 may be arranged in the rear surface (e.g., the lower curved surface 2003 of FIG. 3) of the electronic device 200, and may expose a flash 446 in a passing manner. The key-hole 1327 may be arranged at a lateral surface (e.g., 2005 of FIG. 2) of the electronic device 200, and may expose the key 205 in a passing manner.

The battery cover 330 may include a plate 333, at least one first protrusion 331, at least one second protrusion 334, or a speaker hole 336. The plate 333, which is of a curved shape, may be of for example a shape, which may be bent in right and left orientation (R, L) of the electronic device 200. The plate 333 may be fitted to the battery cover installation part 323 of the device case 320. If the plate 333 of the battery cover 330 is coupled to the device case 320, an outer surface of the plate 333 may be smoothly connected with an outer surface of the device case 320. The at least one first protrusion 331 may be extended from the plate 333, and may be covered by the locker 340. The at least one second protrusion 334 may be extended from the plate 333, and be arranged to face the at least one first protrusion 331. The at least one second protrusion 334 may be inserted into the at least one protrusion groove 324 of the device case 320. The at least one first protrusion 331 and the at least one second protrusion 334 are hindered from being moved by means of the locker 340 and the protrusion groove 324 of the device case 320, respectively. So, the battery cover 330 may be maintained in a state of being coupled to the device case 320. The speaker hole 336 may be provided in the plate 333, and discharge sound from a speaker (not shown) arranged in the battery cover installation part 323 of the device case 320.

The locker 340, which is of a plate shape, may form the rear surface (e.g., the lower curved surface 2003 of FIG. 2) of the electronic device 200, together with the device case 320 and the battery cover 330. The locker 340 may be slid on the device case 320 in the down direction (D) of the electronic device 200. Also, the locker 340 may be restored to the original position due to a restoring means (not shown) (e.g., a spring and the like). For example, an extension spring (not shown) may be arranged between the locker 340 and the device case 320, and may be fixed at its one end to the locker 340 and be fixed at the other end to the device case 320. With the extension spring installed in this manner, the locker 340 may be restored to the original position.

If the locker 340 slides in the down direction (D) of the electronic device 200 (e.g., if the locker 340 is released), the at least one first protrusion 331 of the battery cover 330 is free from hindrance of the locker 340. Here, the battery cover 330 may be rotated upward (e.g., in the Z-axis direction) centering on a connection part (C) between the at least one protrusion groove 324 of the device case 320 and the at least one second protrusion 334 of the battery cover 330 by means of an elastic restoring force of a pop-up device (not shown). In accordance with this, the battery cover 330 may be popped up at its one side from the device case 320, and a user may easily detach the battery cover 330 with catching hold of the one side of the battery cover 330.

Although not illustrated, the locker 340 may also release the prevention of popping-up of the battery cover 330 in a manner of rotating (e.g., a right-to-left rotating manner or an up-to-down rotating manner). For example, if the locker 340 is rotated centering on its one side, the other side of the locker 340 may be moved to a position of not hindering the at least one first protrusion 331 of the battery cover 330.

Although not illustrated, the locker 340 may also release the prevention of popping-up of the battery cover 330 in a manner of taking away (or detaching). For example, if the locker 340 is taken away, the locker 340 may not hinder the at least one first protrusion 331 of the battery cover 330.

Although not illustrated, the locker 330 may also release the prevention of popping-up of the battery cover 330 in a manner of combining sliding, rotation or taking-away.

Although not illustrated, a method of installing the battery cover 330 in the device case 320 is given as follows. The user may insert the at least one second protrusion 334 of the battery cover 330 into the at least one protrusion groove 324 of the device case 320, and fit the battery cover 330 to the device case 320 in a rotating manner under elastic support of the pop-up device (not shown). At this time, while the at least one first protrusion 331 of the battery cover 330 pressurizes a contact surface of the locker 340, the locker 340 may be moved in the down direction (D) of the electronic device 200. When the at least one first protrusion 331 of the battery cover 330 goes beyond the contact surface of the locker 340, the locker 340 may be restored to the original position and cover the at least one first protrusion 331 of the battery cover 330. A sliding contact portion between the at least one first protrusion 331 of the battery cover 330 and the locker 340 may include an inclined plane. The at least one first protrusion 331 of the battery cover 330 may be maintained in a state of being adhered to the locker 340 by a compression force of the pop-up device (not shown).

Figure 5:
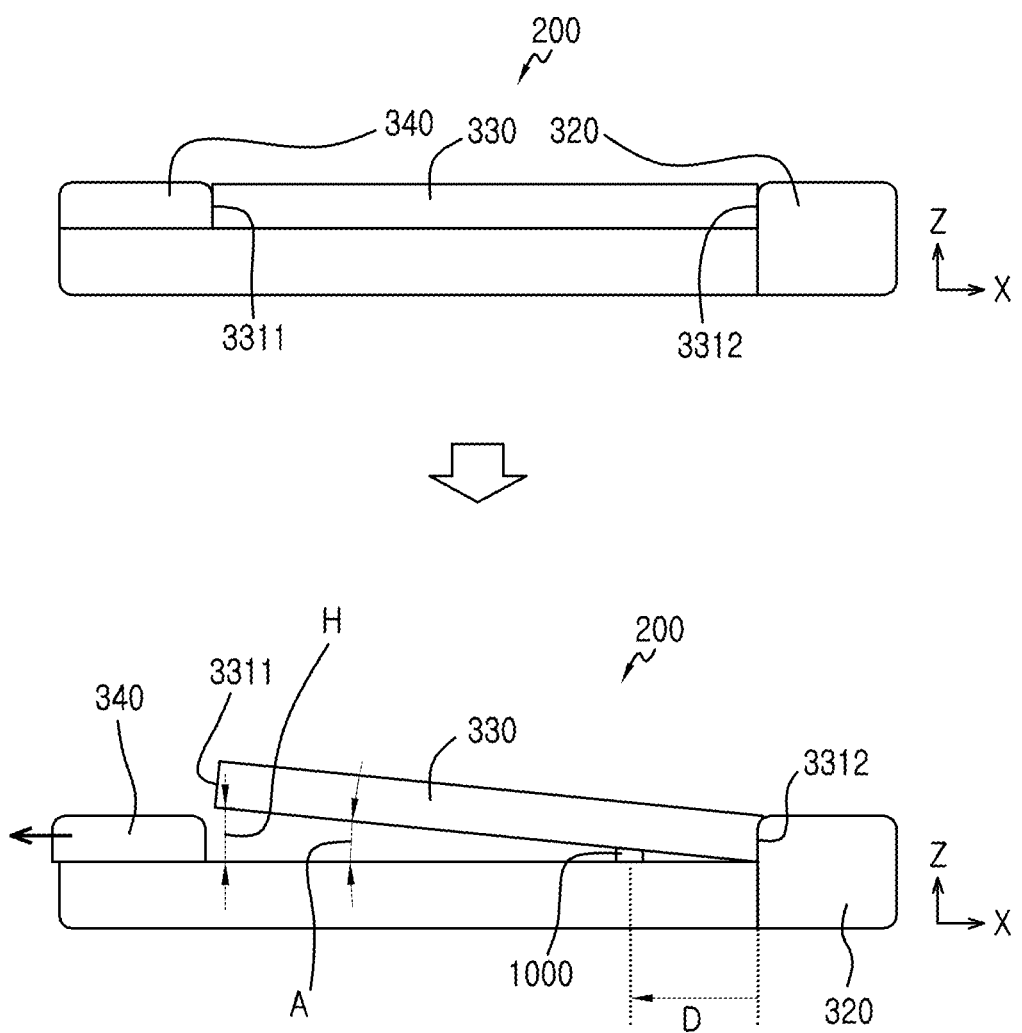
FIG. 5 is an outline diagram illustrating an electronic device according to an embodiment of the present disclosure.

FIG. 5 is an outline diagram illustrating an electronic device according to various embodiments of the present disclosure. The electronic device 200 may include the device case 320, the battery cover 330, the locker 340 and/or a pop-up device 1000.

Referring now to the upper drawing of FIG. 5, the battery cover 330 may be connected rotatable at its one end 3312 to the device case 320, and may be coupled and maintained at its other end 3311 to the device case 320 in a manner of being caught by the locker 340.

Referring now to the lower drawing of FIG. 5, the pop-up device 1000 may be arranged between the device case 320 and the battery cover 330. Due to the movement of the locker 340, the battery cover 330 may be released at the other end 3311 from the locker 340, and may be rotated centering on its one end 3312 by means of an elastic restoring force (e.g., a compression force) of the pop-up device 1000. Here, a rotation angle (A) of the battery cover 330, a pop-up height (H) of the battery cover 330 or the like may be different in accordance to an arrangement position of the pop-up device 1000 (e.g., a distance (D) from a connection part between the device case 320 and the one end 3312 of the battery cover 330). For example, if the pop-up device 1000 is arranged to get closer to a rotation center (e.g., the one end 3312) of the battery cover 330, the rotation angle (A) and pop-up height (H) of the battery cover 330 are increased.

Figure 6:
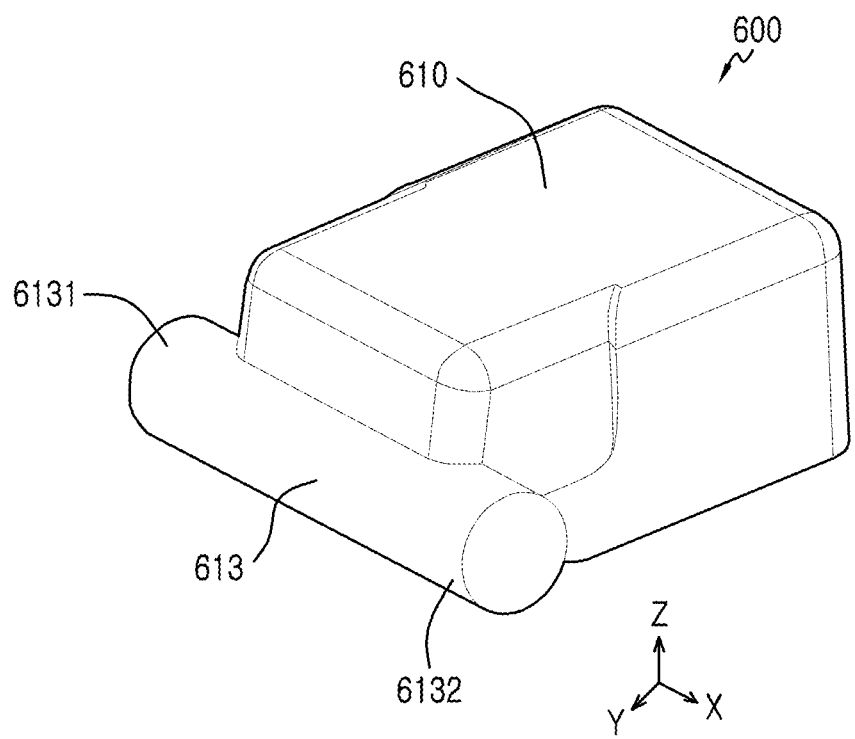
FIG. 6 is a top perspective view illustrating a rotary member in a pop-up device according to various embodiments of the present disclosure.
Figure 7:
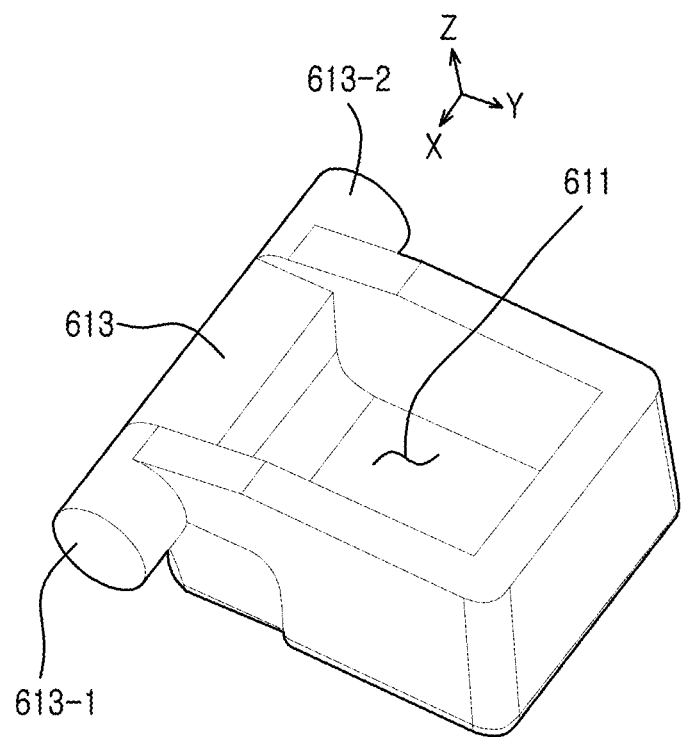
FIG. 7 is a bottom perspective view of the rotary member of FIG. 6.

FIGS. 6 and 7 are perspective views illustrating a rotary member in a pop-up device according to an embodiment of the present disclosure.

Referring now to FIGS. 6 and 7, the rotary member 600 may include a body 610, a spring accepting part 611 and/or a shaft 613. The body 610 may be generally of a square container shape. The spring accepting part 611 may indicate a container part formed in the body 610. The shaft 613 may be formed at one side of the body 610, and may be generally of a cylinder shape. Both side parts 613-1 and 613-2 of the shaft 613 may be protruded with respect to the body 610.

Figure 8:
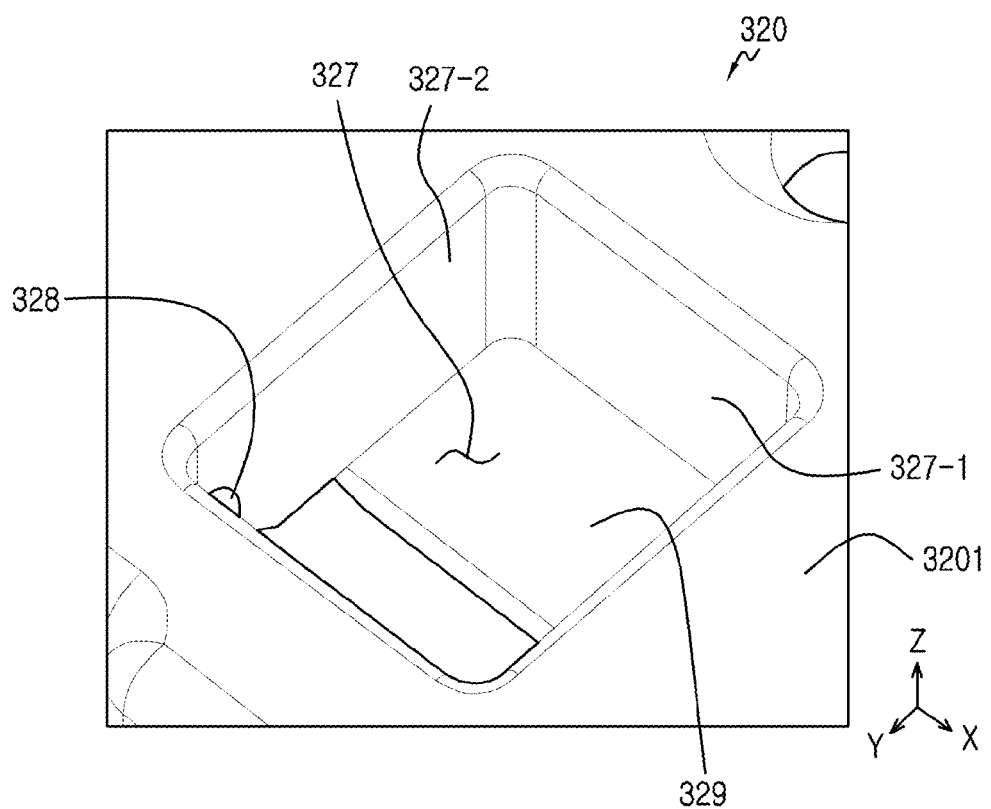
FIG. 8 is a top perspective view illustrating a device case in a pop-up device according to various embodiments of the present disclosure.
Figure 9:
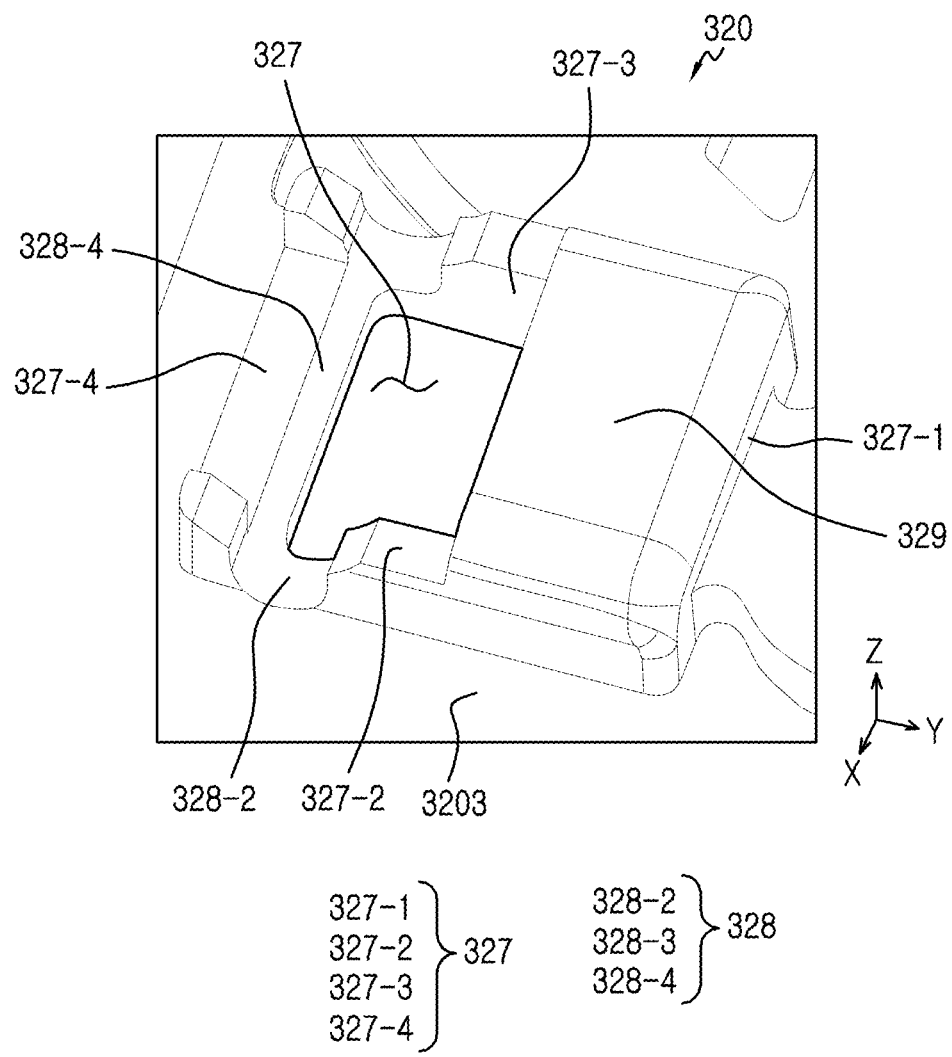
FIG. 9 is a bottom perspective view of the device case of FIG. 8.

FIGS. 8 and 9 are perspective views illustrating a device case in a pop-up device according to various embodiments of the present disclosure. Referring to FIGS. 8 and 9, the device case 320 may include an opening part 327, a shaft holder part 328, and/or a spring support bottom part 329.

The opening part 327 may be of a shape passing through between an upper part 3201 (e.g., a part facing the battery cover 330) of the device case 320 and a lower part 3203 (e.g., a part facing the bracket 310 or the main circuit board 400) of the device case 320. The opening part 327 may include a plurality of annular lateral walls 327-1, 327-2, 327-3, and 327-4. The plurality of lateral walls 327-1, 327-2, 327-3, and 327-4 may be of a shape protruding and extending with respect to the lower part 3203 of the device case 320. The opening part 327 may be generally of a square ring shape.

The shaft holder part 328 is a part into which the shaft 613 of the rotary member 600 is fitted. The shaft 613 of the rotary member 600 may be rotatable and slidable on the shaft holder part 328 of the device case 320. The shaft holder part 328 may include a pair of grooves 328-2 and 328-3. The pair of grooves 328-2 and 328-3 may be provided in a pair of lateral walls 327-2 and 327-3 facing each other of the opening part 327. The one side part 613-1 of the shaft 613 may be arranged in the one groove 328-2 of the shaft holder part 328, and the other side part 613-2 of the shaft 613 may be arranged in the other one groove 328-3 of the shaft holder part 328. Also, the shaft holder part 328 may also further include a curved part 328-4, which may be formed at the side wall 327-4 connecting the pair of lateral walls 327-2 and 327-3. The pair of grooves 328-2 and 328-3 of the shaft holder part 328 and the curved part 328-4 thereof form a smooth circular curved surface. The shaft 613 of the rotary member 600 may be slidably rotated with respect to the circular curved surface. Although not illustrated, a lubricant (e.g., grease) may be intervened between the shaft holder part 328 of the device case 320 and the shaft 613 of the rotary member 600, and may help a smooth rotation of the rotary member 600.

The spring support bottom part 329 of the device case 320 may be arranged under the lower part 3203 of the device case 320, and may be formed in a form of stopping a portion of a passage of the opening part 327 of the device case 320. For example, the spring support bottom part 329 may connect the plurality of lateral walls 327-1, 327-3, and 327-4.

The aforementioned opening part 327, shaft holder part 328 and spring support bottom part 329 of the device case 320 may be integrally formed in a process of molding (e.g., injection molding) the device case 320.

Figure 10:
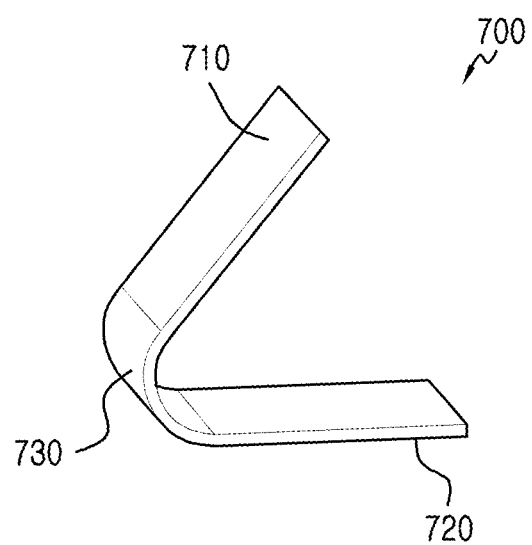
FIG. 10 is a perspective view illustrating a leaf spring in a pop-up device according to an embodiment of the present disclosure.

FIG. 10 is a perspective view illustrating a leaf spring in a pop-up device according to various embodiments of the present disclosure.

Referring now to FIG. 10, the leaf spring 700 may have a bent shape. The leaf spring 700 may be arranged between the spring accepting part 611 (FIG. 7) of the rotary member 600 and the spring support bottom part 329 (FIG. 8) of the device case 320. The leaf spring 700 may include a bending part 730, a first extension part 710, or a second extension part 720. The bending part 730 may connect between the first extension part 710 and the second extension part 720, and have an improved elasticity through heat treatment. The first extension part 710 and the second extension part 720 may have a rigidity that is able to maintain a straight-line form through heat treatment.

Figure 11:
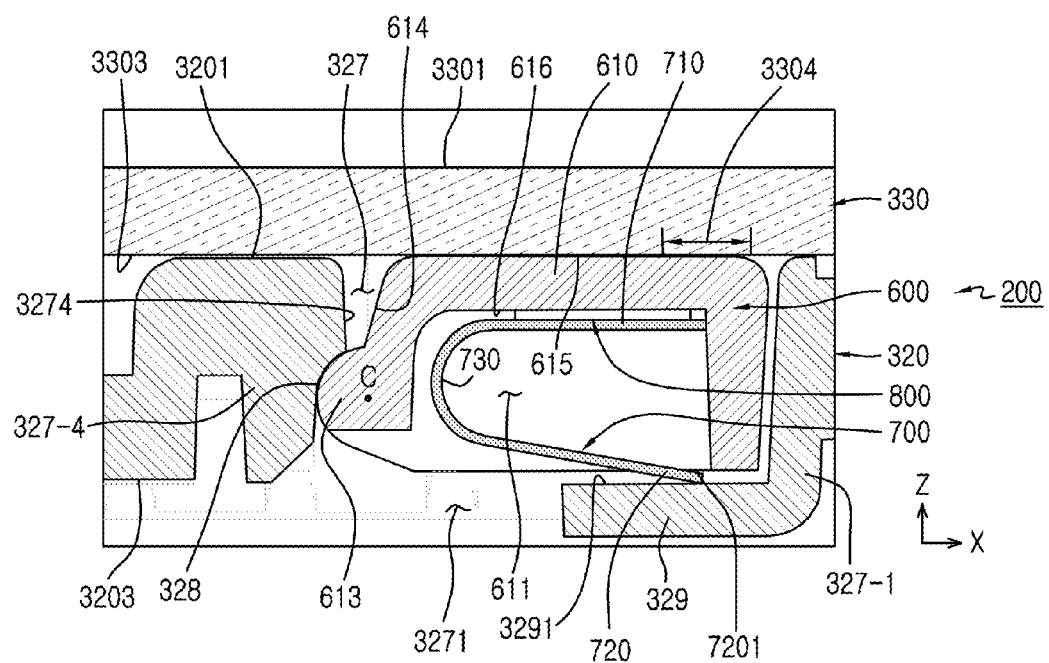
FIG. 11 is a cross section illustrating a principal part of a closed state of a battery cover in an electronic device according to an embodiment of the present disclosure.
Figure 12:
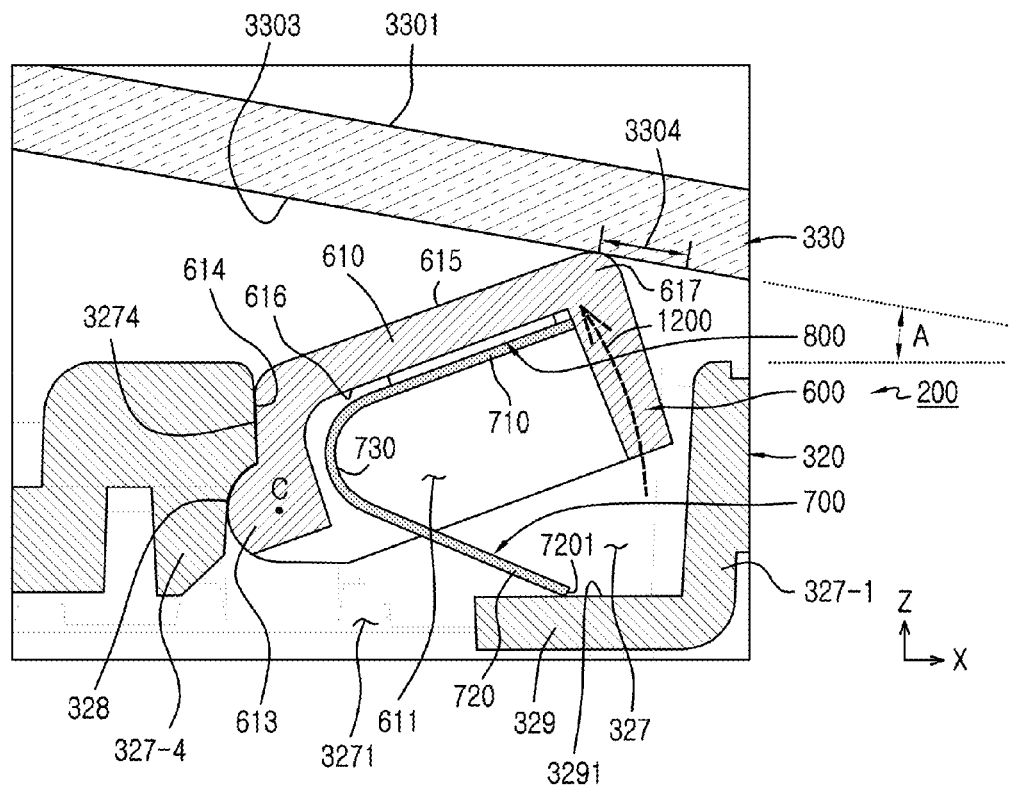
FIG. 12 is a cross section illustrating a principal part of an opened state of a battery cover in an electronic device according to an embodiment of the present disclosure.

FIG. 11 is a cross section illustrating a principal part of a closed state of a battery cover in an electronic device according to various embodiments of the present disclosure. FIG. 12 is a cross section illustrating a principal part of an opened state of a battery cover in an electronic device according to various embodiments of the present disclosure.

Referring now to FIGS. 11 and 12, the electronic device 200 may include the device case 320, the rotary member 600, the leaf spring 700, an attachment member 800, and/or the battery cover 330.

The device case 320 may include the opening part 327, the spring support bottom part 329, or the shaft holder part 328. The opening part 327 is a part passing through between the upper part 3201 and lower part 3203 of the device case 320. The opening part 327 may include the plurality of lateral walls 327-1, 327-2, 327-3 and 327-4 extending downward (e.g., in the Z-axis direction) relatively with respect to the lower part 3203 of the device case 320. The spring support bottom part 329 may be extended horizontally (e.g., in the X-axis direction) from an end of the lateral wall 327-1, and may stop a portion of a passage 3271 of the opening part 327. The shaft holder part 328 may be formed at one side of the opening part 327 and include a circular curved surface.

The rotary member 600 may include the body 610 and the shaft 613. The body 610 may be of a container shape opened down and include the spring accepting part 611. The body 610 may include a broken lateral surface 614 connected to a circular curved surface of the shaft 613. The shaft 613 may be extended from one side of the body 610 and be arranged at the shaft holder part 328 of the device case 320. The shaft 613 is sliding rotatable with respect to a circular curved surface of the shaft holder part 328 of the device case 320. The body 610 is rotatable with respect to a rotation center (C) of the shaft 613 such that the body 610 goes in and out the opening part 327 of the device case 320. At this time, the lateral surface 614 of the body 610 may come in contact to an inner lateral surface 3274 of the opening part 327 of the device case 320. So, the body 610 may be no longer rotated in opening orientation 1200.

The leaf spring 700 may be arranged between the spring accepting part 611 of the rotary member 600 and the spring support bottom part 329 of the device case 320. The bending part 730 of the leaf spring 700 may be arranged toward the shaft 613 of the rotary member 600. The first extension part 710 of the leaf spring 700 may be attached to an inner upper surface 616 of the spring accepting part 611 of the rotary member 600 through the medium of the attachment member 800 (e.g., a double-sided tape, a bond, a bolt or the like). An end 7201 of the second extension part 720 of the leaf spring 700 may get in contact to a surface 3291 of the spring support bottom part 329 of the device case 320. The leaf spring 700 may provide a force to rotate the rotary member 600 to an opening orientation along directional arrow 1200. When the rotary member 600 is rotated, the leaf spring 700 is deformed in an unfolding or folding form. At this time, the end 7201 of the second extension part 720 of the leaf spring 700 may be moved along the surface 3291 of the spring support bottom part 329 of the device case 320. In addition to this, various embodiments applying other elastic members (e.g., a compression spring and the like) in place of the leaf spring 700 are also possible.

An upper part 3301 of the battery cover 330 or a lower part 3303 thereof may include a plane or a curved surface. When the battery cover 330 is in a closed position (referring to FIG. 11), the lower part 3303 of the battery cover 330 may be arranged to face the upper part 3201 of the device case 320. Also, at this time, at least a portion of an outer upper surface 615 of the body 610 of the rotary member 600 may get in contact to the lower part 3303 of the battery cover 330 by means of a compression force of the leaf spring 700.

When the locker (e.g., the locker 340 of FIG. 4) unlocks (i.e., releases) the battery cover 330 in a state in which the battery cover 330 is closed, an outer portion 617 of the body 610 of the rotary member 600 may rotate in opening orientation 1200 with respect to the center (C) while pressurizing the lower part 3303 of the battery cover 330, and the battery cover 330 may be opened in such a manner that the battery cover 330 rotates (e.g., 'A' angle rotating) centering on the other side (not shown) of the battery cover 330 (referring to FIG. 12). Here, the outer portion 617 of the body 610 of the rotary member 600 may be moved along a certain section 3304 of the lower part 3303 of the battery cover 330 with getting in contact with the lower part 3303 of the battery cover 330. A range of the certain section 3304 or more of the lower part 3303 of the battery cover 330 getting in contact with the outer portion 617 of the body 610 of the rotary member 600 may be heat treated or be reinforced with a separate reinforcement member. This may prevent the damage of the certain section 3304.

Although not illustrated, when the locker locks the battery cover 330 in a state in which the battery cover 330 is opened, the elements 600 and 700 may operate reversely to the aforementioned operations.

Figure 13:
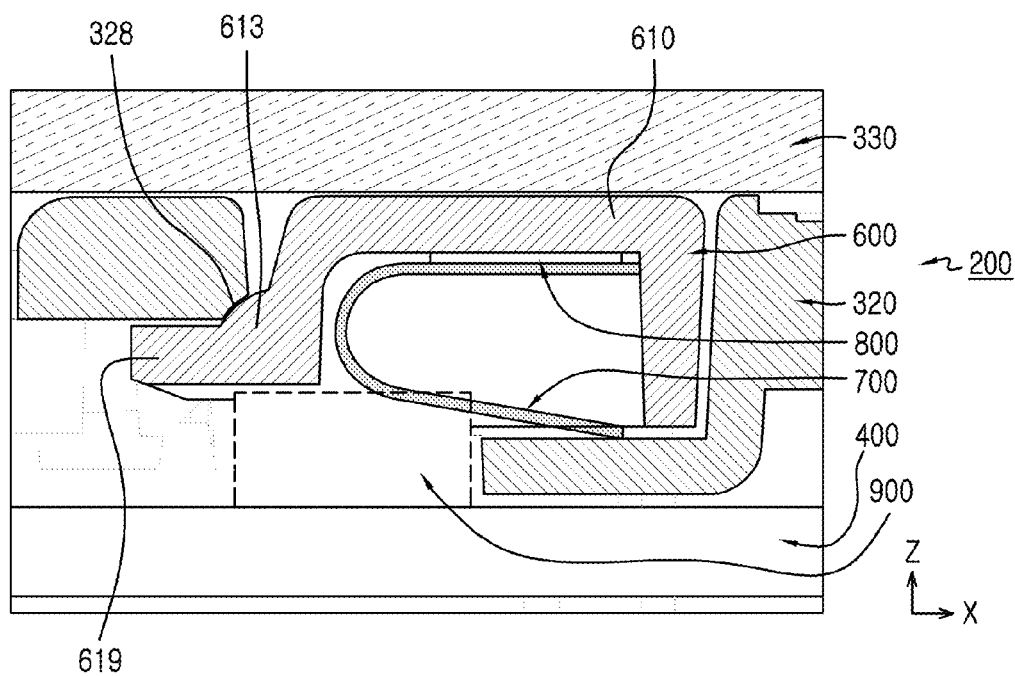
FIG. 13 is a perspective view illustrating a principal part of an electronic device according to an embodiment of the present disclosure.

FIG. 13 is a perspective view illustrating a principal part of an electronic device according to various embodiments of the present disclosure.

Referring to FIG. 13, the electronic device 200 may include the device case 320, the rotary member 600, the leaf spring 700, the attachment member 800, the battery cover 330, at least one electrical connection member 900, and/or the main circuit board 400.

The device case 320, the rotary member 600, the leaf spring 700, the attachment member 800, and the battery cover 330 may include constructions similar to the descriptions of FIGS. 11 and 12. However, the rotary member 600 may be molded of conductive materials through, for example, a magnesium die-casting process, an aluminum numerical-control process or the like. The rotary member 600 may further include an extension part 619 extended from the shaft 613 and arranged under the device case 320.

The leaf spring 700 may be molded of conductive materials.

The attachment member 800 (e.g., a conductive tape) may be of conductive materials.

The battery cover 330 may include at least a portion of conductive materials. In a state in which the battery cover 330 is not detached (e.g., if the battery cover 330 is in a closed position or is in an opened position), the battery cover 330 may be in electrical contact with at least a portion of the body 610 of the rotary member 600.

As shown in FIG. 13, at least one electrical connection member 900 (e.g., an elastic fragment, a cable, a pogo pin or the like) may be arranged between the main circuit board 400 and the rotary member 600. The at least one electrical connection member 900 may be electrically connected between the main circuit board 400 and at least one of the rotary member 600 or the leaf spring 700.

The main circuit board 400 may be arranged under the device case 320. The main circuit board 400 may include the ground (not shown). Also, the main circuit board 400 may include an RF module (not shown). The RF module may further include a component for transmitting/receiving an electromagnetic wave on a free space in wireless communication, for example, a conductor, a conductive wire or the like. The RF module may take charge of transmission/reception of data, for example, transmission/reception of an RF signal or a called electronic signal. The RF module may include, though not illustrated, for example, a transceiver, a Power Amplifier Module (PAM), a frequency filter, a Low Noise Amplifier (LNA) or the like.

At least one of the rotary member 600, the leaf spring 700 or the attachment member 800 may be used as an additional grounding body of the main circuit board 400 through the medium of the at least one electrical connection member 900. Also, the battery cover 300 may be used as an additional grounding body of the main circuit board 400 through the medium of the rotary member 600. Also, the at least one electrical connection member 900 may be applied as an additional grounding body of the main circuit board 400. The main circuit board 400 may improve Electro-Magnetic Interference (EMI) shielding, ElectroStatic Discharge (ESD) shielding, RF performance or the like through the additional grounding bodies (e.g., the rotary member 600, the leaf spring 700, the attachment member 800, the battery cover 330, and/or the at least one electrical connection member 900).

Figure 14:
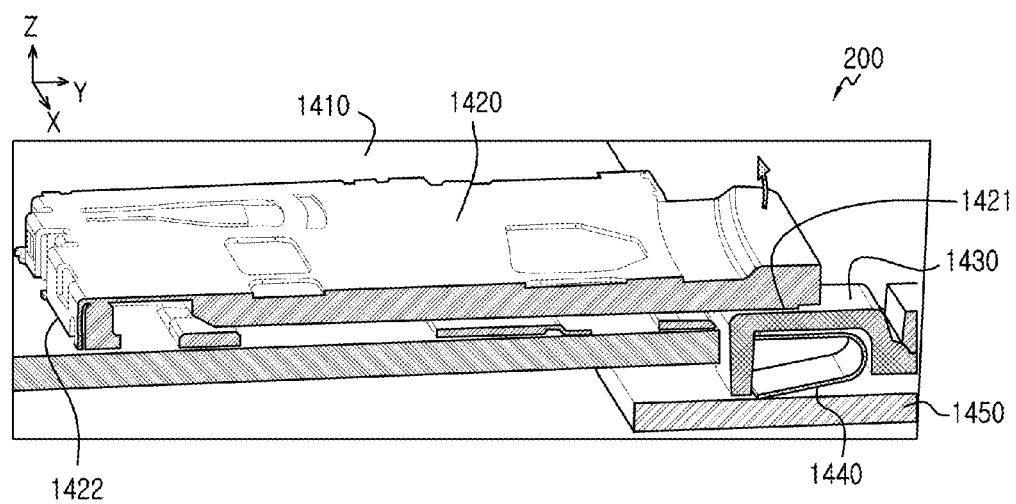
FIG. 14 is a cross section illustrating a principal part of an electronic device according to an embodiment of the present disclosure.

FIG. 14 is a cross section illustrating a principal part of an electronic device according to various embodiments of the present disclosure.

Referring to FIG. 14, the electronic device 200 may include a board 1410, a memory socket 1420, a rotary member 1430, a leaf spring 1440, or a frame 1450.

The board 1410 may be arranged under the memory socket 1420, and may mount the memory socket 1420 thereon. The board 1410 may include a Printed Circuit Board (PCB) (e.g., the main circuit board 400). The board 1410 may have a structure of being rotatable centering on one side (not shown).

The memory socket 1420 may have a structure of detaching a memory card (i.e., CF, SD, Micro-SD, Mini-SD or the like). An entrance part 1421 of the memory socket 1420 may have a form of being extended not to overlap with the board 1410. The memory socket 1420 may also have a structure of being rotatable centering on one side 1422 with respect to the board 1410.

The rotary member 1430, the leaf spring 1440, and the frame 1450 may have constructions and structures similar to the aforementioned rotary member 600, leaf spring 700, and device case 320. The rotary member 1430 may be arranged under the entrance part 1421 of the memory socket 1420.

Although not illustrated, if a member (e.g., the battery cover 330) stopping the rotation (or opening) of the memory socket 1420 is released, the rotary member 1430 may be popped up (e.g., in the Z-axis direction) due to a compression force of the leaf spring 1440, and the entrance part 1421 of the memory socket 1420 may be popped up in response to the popping-up of the rotary member 1430. Accordingly, the user may easily detach the memory card from the popped-up entrance part 1421 of the memory socket 1420.

According to various embodiments of the present disclosure, an electronic device may include a housing (e.g., a device case 320) including at least a portion (e.g., a battery cover 330) that is popped up, a locker 340 for holding at least the portion 330 of the housing 320 in a non-pop-up state, and a pop-up device 1000 for popping up at least the portion 330 of the housing 320 when the locker 340 releases at least the portion of the housing 320.

According to an embodiment of the present disclosure, the electronic device may include the housing (e.g., the device case 320), the cover (e.g., the battery cover 330) installed in at least a portion of the housing 320 and capable of being popped up with respect to the housing 320, the locker 340 for maintaining the cover 330 in a non-pop-up state, and the pop-up device 1000 arranged under the cover 330 and, upon release of the locker 340, popping up the cover 330. For example, the cover 330 may be popped up at the other side with respect to the housing 320 in a manner of being rotated with respect to one of its sides.

According to an embodiment of the present disclosure, the pop-up device 1000 may pop up the cover 330 with respect to the housing 320 in a manner of pushing up the cover (e.g., the battery cover 330) by using an elastic restoring operation.

According to an embodiment of the present disclosure, the pop-up device may pop up the cover (e.g., the battery cover 330) with respect to the housing 320 in a manner of pushing up the cover (e.g., the battery cover 330) by rotating the cover centering on its one side by an elastic restoring force and popping up the cover at its other side.

According to an embodiment of the present disclosure, the pop-up device 1000 may include an opening part 327 provided in the housing (e.g., the device case 320), a shaft holder part 328 formed at one side of the opening part 327, a spring support bottom part 329 arranged in a form of stopping a portion of a passage of the opening part 327, a shaft 613 arranged at the shaft holder part 329, and rotatable sliding on the shaft holder part 329, a body 610 connected to the shaft 613, and rotated about a central axis extending along the length of the shaft 613 and inserted into the opening part 327 or popping out of the opening part 327, and an elastic member 700 arranged between the body 610 and the spring support bottom part 329, and elastically pressurizing the body 610 under support of the spring support bottom part 329.

According to an embodiment of the present disclosure, the elastic member 700 may include a spring (e.g., a leaf spring).

According to an embodiment of the present disclosure, one side (e.g., a first extension part 710) of the spring 700 may be coupled to the body 610, and the other side (e.g., the second extension part 720) of the spring 700 may be arranged to be slid on the spring support bottom part 329.

According to an embodiment of the present disclosure, the spring 700 may be attached to the body 610 through the medium of a double-sided tape (e.g., an attachment member 800).

According to various embodiments of the present disclosure, the body 610 may include an accepting part (e.g., a spring accepting part 611) opened down, and the elastic member (e.g., the leaf spring 700) may be inserted into the accepting part of the body 610.

According to various embodiments of the present disclosure, the pop-up device 1000 may include conductive materials.

According to various embodiments of the present disclosure, the electronic device 200 may further include a PCB (e.g., the main circuit board 400) arranged under the pop-up device 1000. The pop-up device 1000 may be electrically connected to the PCB 400.

According to an embodiment of the present disclosure, the electronic device 200 may further include at least one electrical connection member arranged between the PCB (e.g., the main circuit board 400) and the pop-up device 1000, and electrically connecting the PCB 400 and the pop-up device 1000.

According to an embodiment of the present disclosure, the cover (e.g., the battery cover 330) may include at least a portion of conductive materials.

According to an embodiment of the present disclosure, at least the portion of conductive materials of the cover (e.g., the battery cover 330) may be electrically connected with the body 610.

According to an embodiment of the present disclosure, the locker 340 may be released in a sliding manner such that transitioning to the popped-up state is allowed. The locker 340 may also be released to no longer prevent of popping-up of the battery cover 330 by being rotated. The locker 340 may also be released to allow, although not illustrated, the popping-up of the battery cover 330 by being taken away, for example, detached from the remainder of the housing.

According to an embodiment of the present disclosure, if the cover (e.g., the battery cover 330) maintains the non-pop-up state by the locker 340, an outer surface of the housing (e.g., the device case 320), an outer surface of the cover (e.g., the battery cover 330), and an outer surface of the locker 340 may be smoothly connected with one another.

According to an embodiment of the present disclosure, the electronic device 200 may include at least one protrusion groove 324 provided in the housing (e.g. the device case 320), and at least one protrusion (e.g., a second protrusion 334) formed at one side of the cover (e.g., the battery cover 330), and inserted into the at least one protrusion groove 324 of the housing 320. The cover (e.g., the battery cover 330) may be rotatable with respect to a connection part between the at least one protrusion 334 and the at least one protrusion groove 324.

According to an embodiment of the present disclosure, the cover (e.g., the battery cover 330) may include a catching protrusion (e.g., the first protrusion 331), which may be arranged at the other side facing the connection part, and the locker 340 may stop popping-up of the cover 330 in a manner of covering the catching protrusion 331.

According to an embodiment of the present disclosure, the electronic device 200 may include at least one detachable component arranged in the housing (e.g., the device case 320), and covered with the cover (e.g., the battery cover 330).

According to an embodiment of the present disclosure, the at least one detachable component may include one of a battery 500, a memory card or an identification (ID) card.

According to an embodiment of the present disclosure, the cover (e.g., the battery cover 330) may include at least one curved surface.

When the locker 340 is released, the cover (e.g., the battery cover) may be popped up at its one side and thus, the user may easily detach the cover.

While the disclosure has been shown and described with reference to certain preferred embodiments thereof, it will be understood by those skilled in the art that various changes in form and details may be made therein without departing from the spirit and scope of the disclosure as defined by the appended claims. Furthermore, no claim element herein is to be construed under the provisions of 35 U.S.C. §112, sixth paragraph, unless the element is expressly recited using the phrase "means for".

What is claimed is:

1. An electronic device comprising:
    a housing comprising a portion that is configured to be transitionable between a pop-up state and a non-pop-up state;
    a locker for releasably holding the portion of the housing in the non-pop-up state; and
    a pop-up device for transitioning the portion of the housing to the pop-up state when the locker releases the portion of the housing.

2. The electronic device of claim 1, wherein the pop-up device transitions the portion of the housing to the pop-up state by pushing up the portion of the housing applying an elastic restoring force to the portion of the housing.

3. The electronic device of claim 1, wherein the pop-up device transitions the portion of the housing to the pop-up state by rotating a first side of the portion of the housing via an elastic restoring force such that a second side of the portion pops up.

4. The electronic device of claim 3, wherein the pop-up device includes:
    an opening part provided in the housing;
    a shaft holder part formed at one side of the opening part;
    a spring support bottom part provided within a passage of the opening part;
    a shaft at least partially positioned within the shaft holder part and rotatable slidable with respect to the shaft holder part;
    a body coupled to the shaft and rotatable with respect to the shaft, the body being transitionable between a position at least partially positioned within the opening part and a position at least partially popping out of the opening part; and
    an elastic member positioned between the body and the spring support part, the elastic member elastically pressurizing the body by pressing against the spring support bottom part.

5. The electronic device of claim 4, wherein the elastic member includes a spring.

6. The electronic device of claim 5, wherein one side of the spring is coupled to the body, and another side of the spring is configured to slidably contact the spring support bottom part.

7. The electronic device of claim 6, wherein the spring is attached to the body via a double-sided tape.

8. The electronic device of claim 4, wherein the body includes an accepting part and the elastic member is positioned within the accepting part of the body.

9. The electronic device of claim 4, wherein the pop-up device includes a conductive material.

10. The electronic device of claim 9, further comprising a printed circuit board (PCB) positioned under the pop-up device, the pop-up device being electrically connected to the PCB.

11. The electronic device of claim 10, further comprising at least one electrical connection member arranged between the PCB and the pop-up device and electrically connecting the PCB and the pop-up device.

12. The electronic device of claim 10, wherein the portion of the housing includes at a conductive material.

13. The electronic device of claim 12, wherein the conductive material is electrically connected with the body.

14. The electronic device of claim 1, wherein the locker releases the portion of the housing via at least one of a sliding, rotation, and taking-away movement.

15. The electronic device of claim 14, wherein when the portion of the housing is being held in the non-pop-up state by the locker, an outer surface of the housing, an outer surface of the portion of the housing, and an outer surface of the locker are smoothly connected with one another.

16. The electronic device of claim 1, comprising:
    at least one protrusion groove provided in the housing; and
    at least one protrusion formed at one side of at least the portion of the housing, and inserted into the at least one protrusion groove of the housing, wherein the portion of the housing is rotatable with respect to a connection part between the at least one protrusion and the at least one protrusion groove.

17. The electronic device of claim 16, wherein at least the portion of the housing includes a catching protrusion which is positioned at an opposing side with respect the connection part, and the locker stops popping-up of at least the portion of the housing by covering the catching protrusion.

18. The electronic device of claim 1, further comprising at least one detachable component arranged in the housing and at least partially covered by the portion of the housing.

19. The electronic device of claim 18, wherein the at least one detachable component includes at least one of a battery, a memory card, and an identification (ID) card.

20. The electronic device of claim 1, wherein the portion of the housing includes at least one curved surface.

* * * * *